Oct. 30, 1951     H. L. SOLIE     2,573,504
SEALING DEVICE
Filed Feb. 2, 1948     3 Sheets-Sheet 3
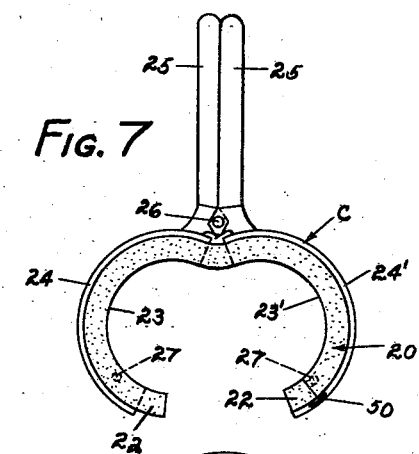
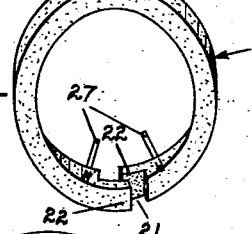
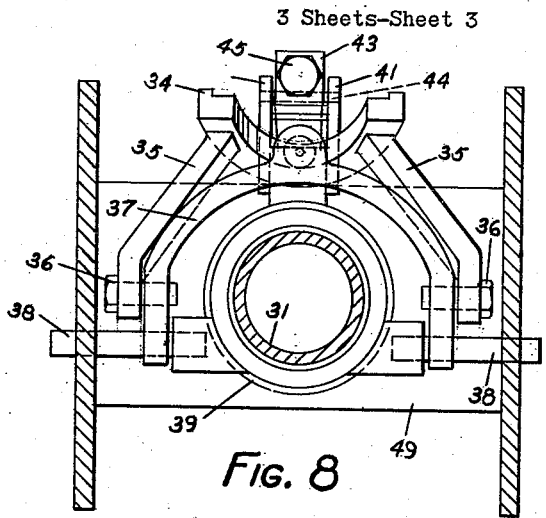
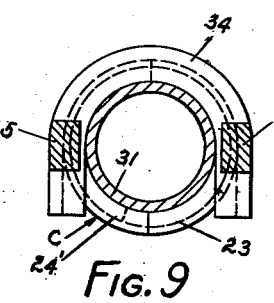
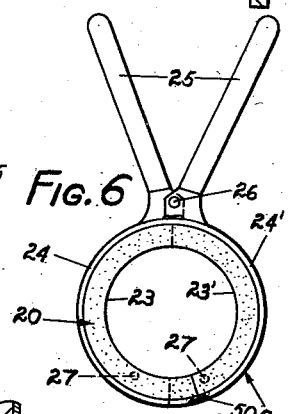
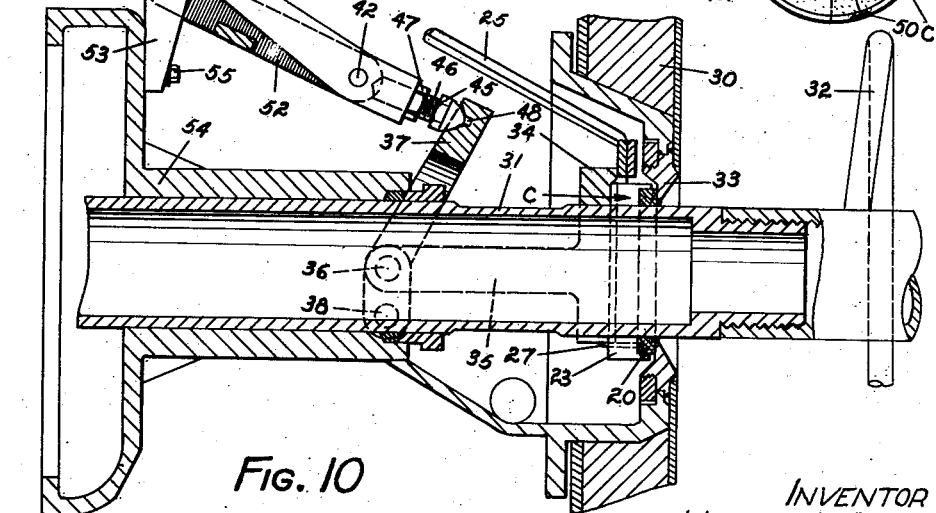
INVENTOR
HAROLD L. SOLIE
BY Paul, Paul & Moore
ATTORNEYS Patented Oct. 30, 1951

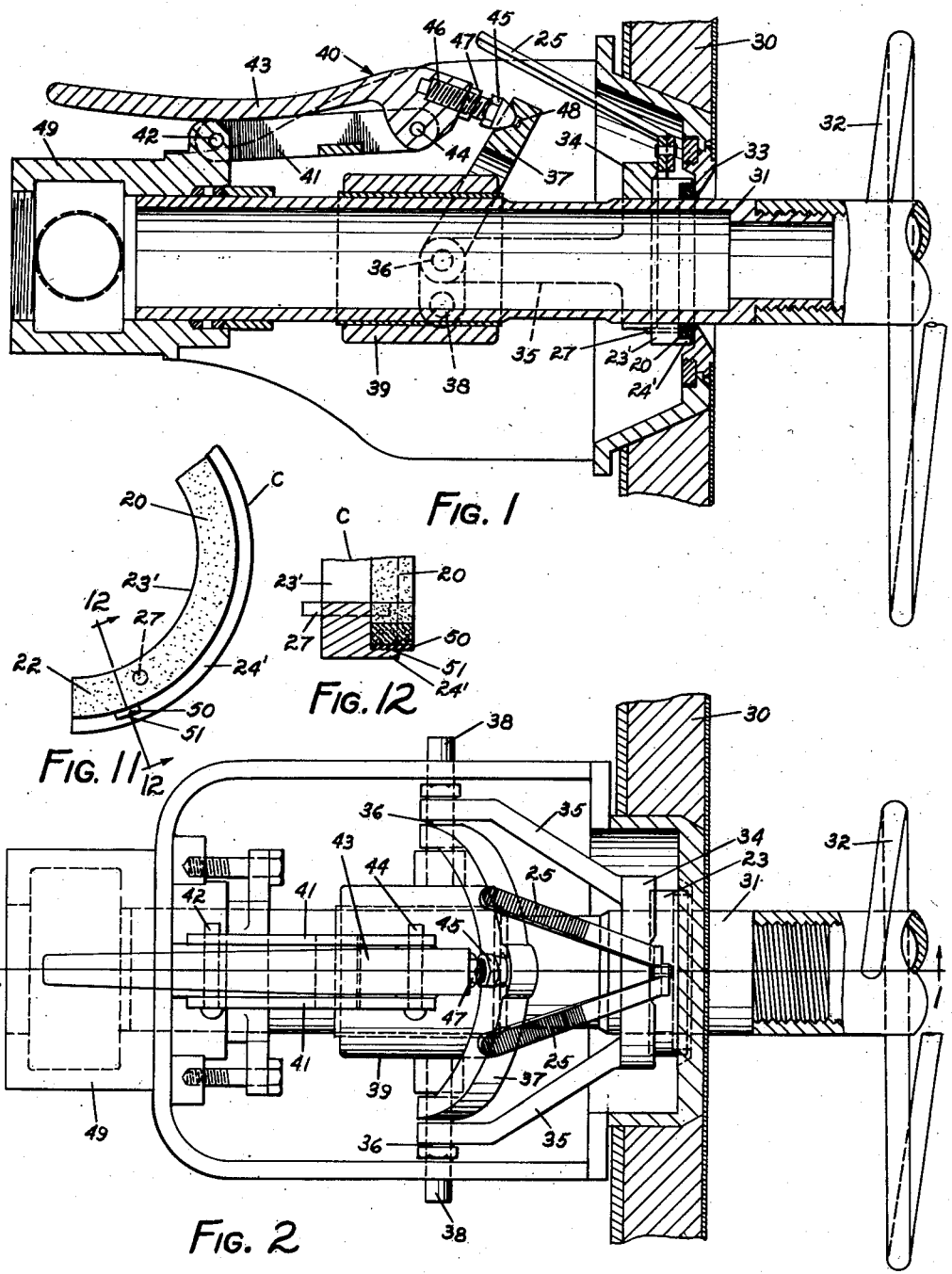

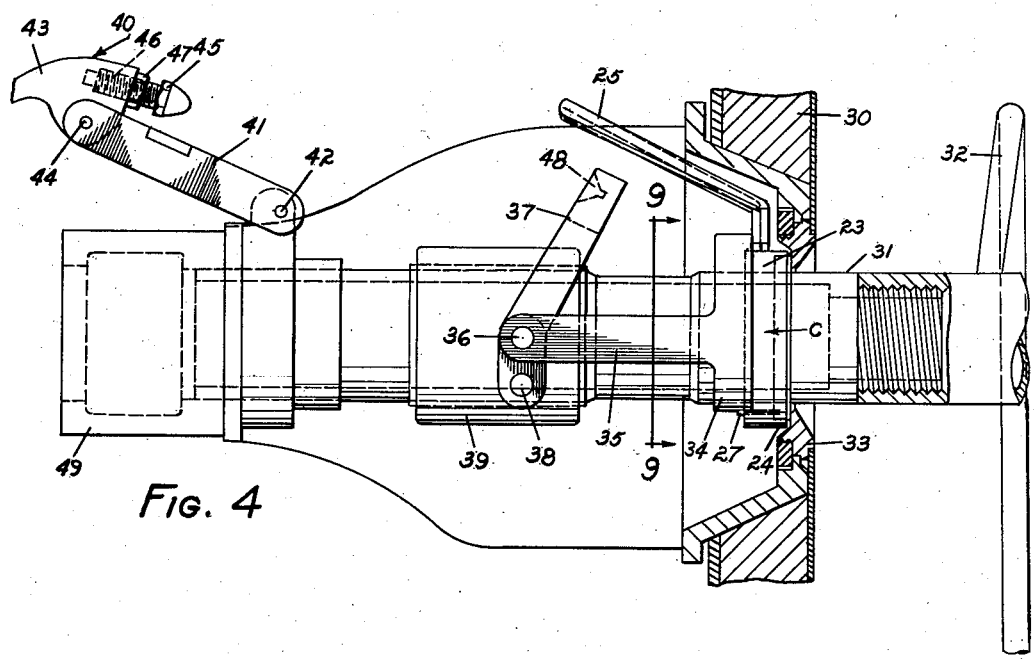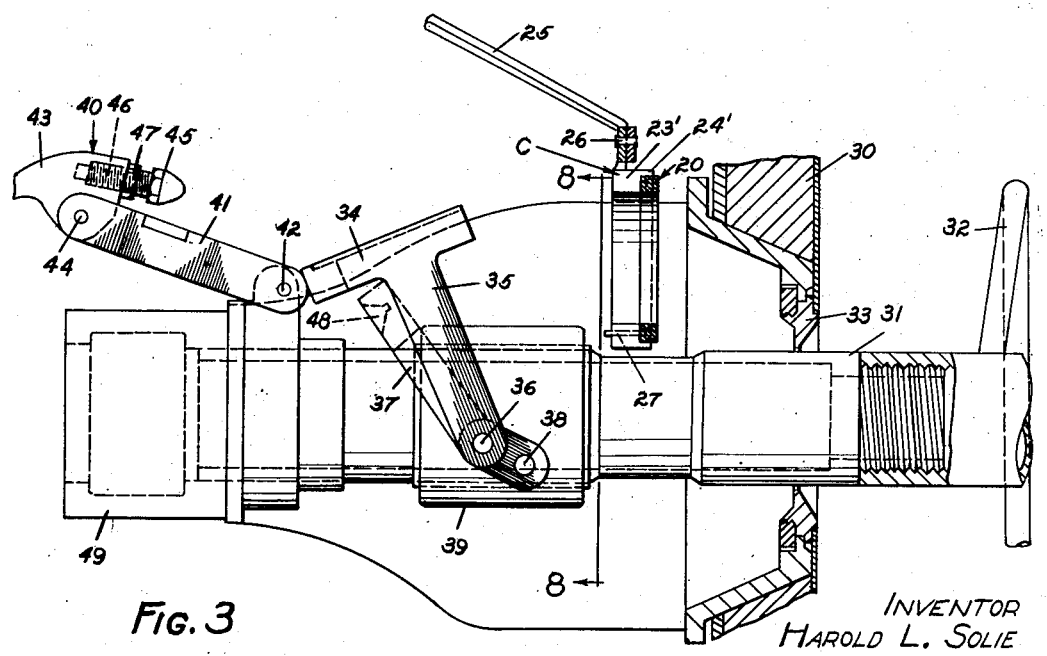

2,573,504

UNITED STATES PATENT OFFICE 2,573,504

SEALING DEVICE

Harold L. Solie, Minneapolis, Minn.

Application February 2, 1948, Serial No. 5,819

9 Claims. (Cl. 286—7)

This invention relates to a new and improved readily detachable sealing device adapted for use in connection with a shaft to prevent the infiltration or leakage of oil lubricants and other foreign matter through a shaft bearing or through an opening in a wall through which the shaft may pass, as for example, the end walls of a pasteurizer. The invention will be described with particular reference to pasteurizers, although it is to be understood that the invention may be equally applicable to other devices or apparatus in which a similar problem may be encountered.

Conventional pasteurizers usually comprise a suitable tank in which there is disposed a horizontal agitator provided with a shaft which customarily passes through suitable openings in the end walls of the tank and are mounted in bearings provided exteriorly of the end walls of the tank. It is of utmost importance in the operation of a pasteurizer that means be provided at the end walls of the tank where the agitator shaft passes through to prevent access of grease, lubricants, and other foreign matter into the pasteurizer. To prevent the possible danger of oil and lubricants used for lubricating the agitator shaft bearings from entering the pasteurizer, such bearings may be located in outwardly spaced relation from the end walls of the tank and a suitable sealing means is then provided around the shaft where it passes through the tank end walls thereby to prevent foreign matter from entering the pasteurizer around the shaft.

Heretofore such sealing means or packings have customarily been in the form of packing glands used in combination with a suitable packing or sealing element which could be compressed against a suitable backing plate or the bottom of a bore by manipulation of the packing gland, thereby to compress the packing against the shaft to prevent leakage. Such sealing devices, however, are not readily accessible for cleaning, replacement, or repair and, as a result, some operators would often operate a pasteurizer for long periods without replacement, or removing the packing for cleaning whereby there was ever present the possibility of contamination from lubricants and other foreign matter, as well as bacteria, with the result that products processed in such equipment might become contaminated and raise the question as to the suitability of such equipment on the part of health authorities.

The novel sealing device herein disclosed has been found very effective to positively seal the openings in the end walls of a pasteurizer tank through which the usual agitator shaft passes. Moreover, it is so constructed that it may readily be removed without difficulty for cleaning or replacement, whereby it is possible to subject the packing to daily cleaning and sterilization and thereby eliminate all question of food contamination.

An object of the present invention therefore is to provide a readily detachable sealing device which may be quickly and conveniently applied to a shaft to seal the opening in a wall through which the shaft may pass, and which device has means for retaining it in sealing engagement with the shaft and the wall in a manner to positively prevent the passage of foreign matter around the shaft through said opening.

A further object of the invention is to provide a sealing device comprising a readily removable annular cage fashioned to support an annular packing element, said cage and packing element being split and the cage comprising complemental semi-circular sections pivoted together and provided with means whereby they may be swung outwardly to open positions, after a packing element has been inserted therein, whereby said sealing device may be quickly fitted over a shaft or removed therefrom, and means being provided in conjunction with the packing cage to lock its complemental sections in closed condition around the shaft and whereby the packing, which may project axially from the open end of the cage, may be compressed against a suitable backing plate to thereby force the compressible packing into sealing engagement with the periphery of the shaft and thereby positively seal the opening through which the shaft passes against all leakage.

A further object is to provide a sealing device adapted for use in connection with a novel packing element to be used on the shaft of a pasteurizer to prevent the entrance of lubricants and other foreign matter through the openings in the end walls thereof through which the agitator shaft passes, said device comprising a split packing supporting cage operable to embrace the pasteurizer shaft and having means for forcibly axially translating it on the shaft against a suitable backing wall or plate to thereby compress the packing against the shaft and backing plate whereby leakage around the shaft is made impossible.

Other objects of the invention reside in the unique construction of the sealing device, per se, whereby it is self-contained and may readily be fitted onto or removed from the shaft with which it is to be used when the supporting means therefor is made inoperative; in the means provided for securing the sealing device in operative position on the shaft which means is readily accessible for manipulation and serves the dual function of locking the sealing device in operative position and axially translating it on the shaft to cause the packing of the sealing device to be compressed against the shaft; in the means provided in the operating mechanism for the sealing device for taking up wear in the packing element; in the provision of means in the packing cage for sealing the joint between the split ends of the packing when the packing element is in operative position upon the shaft; in the construction of such a sealing device and its associated mechanism which readily lends itself for use in connection with the agitator shafts of pasteurizers and other equipment where it may be found applicable, whereby said mechanism may be manufactured in quantity production at low cost; and in the provision of such a sealing device and operating mechanism therefor which is extremely simple to operate, whereby an inexperienced operator may quickly remove and inter-change or thoroughly clean the packings provided around the shaft at the end walls of a pasteurizer or other apparatus, and whereby the packing, which is of a highly absorbent nature, readily lends itself for daily cleaning and sterilization in a comparatively short period of time.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a longitudinal sectional view on the line 1—1 of Figure 2, showing a conventional form of bearing structure at one end of a pasteurizer with the invention embodied therein and showing the sealing device operatively engaged with the pasteurizer shaft;

Figure 2 is a plan view of Figure 1;

Figure 3 is a side elevation of the apparatus, partially in section, and showing the sealing device in position to be fitted around the pasteurizer shaft, the securing means therefor being shown in inoperative position;

Figure 4 is a similar view but showing the sealing device in position on the pasteurizer shaft with the means for locking the sealing device in closed position engaged therewith;

Figure 5 is a perspective view of the compressible packing element removed from the cage;

Figure 6 is a view showing the compressible packing fitted into the split supporting cage and the cage being shown in closed position;

Figure 7 is a view similar to Figure 6 but showing the cage in open position;

Figure 8 is a transverse section on the line 8—8 of Figure 3;

Figure 9 is a transverse section on the line 9—9 of Figure 4;

Figure 10 is a longitudinal section similar to Figure 1, but showing a sealing device operating mechanism of slightly different construction;

Figure 11 is a view on a slightly larger scale, showing a flexible sealing strip embodied in one of the sections of the packing supporting cage for sealing the exposed portion of the joint between the split ends of the packing element when the element is fitted onto a shaft; and Figure 12 is a detail sectional view on the line 12—12 of Figure 11.

With particular reference to Figures 5, 6 and 7, the novel sealing device herein disclosed is composed of a compressible gasket element 20 which is split, as shown at 21, and is provided with overlapping ends 22 to serve the purpose of completely sealing the ends when compressed. The compressible packing element 20 is removably contained within an annular supporting cage, shown in Figures 6, 7, 11 and 12, and generally designated by the reference character C. The cage C is composed of two semi-circular ring sections 23 and 23' which have upstanding semi-circular flanges 24 and 24', respectively. The two semi-circular halves of the cage are attached to lever members 25 which are suitably pivoted together at 26.

The lever members 25 are offset from the plane of the ring sections 23 and 23', as is apparent in Figures 1 and 4, thereby to facilitate applying the device to a shaft of the character shown on the drawings or removing it therefrom, as indicated in dotted lines in Figures 1, 3 and 7. Pins 27 extend through corresponding holes in the semi-circular members 23 and 23' of the packing cage C and serve to hold the packing element in the cage in such a manner that when the handles 25 are moved from the position shown in Figure 6 to the position shown in Figure 7, the cage and packing element are opened, as shown in Figure 7, whereby the cage may readily be fitted around a cylindrical body such as the agitator shaft of a conventional pasteurizer, partially indicated in the drawings.

With particular reference to Figures 1 and 2, it will be seen that the sealing device is designed for application to a cylindrical body such as a shaft passing through a wall as, for example, an end wall of a pasteurizer, its purpose being to seal the joint between the shaft and wall opening. In the drawings there is shown, as hereinbefore stated, a portion of an end wall 30 of a conventional pasteurizer, through which a shaft 31 passes. In this instance the shaft is hollow and serves as a means for circulating a heat transfer medium through the hollow member such as a pasteurizer coil 32.

A backing ring or plate 33, preferably of non-corrosive material, is fixedly supported in the opening in the end wall 30 and has an opening therein adapted to receive the shaft 31. The backing plate 33 serves as a pressure plate against which the packing material or element 20 may be compressed by axial movement of the packing cage C on the shaft 31, as will later be described.

The means provided for axially translating the packing cage C along the shaft 31 to force the packing element 20 into seal-tight engagement with the backing plate 33 and shaft 31, is shown comprising a yoke 34 of substantial U-shaped configuration. The yoke 34 has its closed portion disposed over the shaft with its legs arranged to straddle the shaft, as clearly illustrated in Figures 1, 2, 4, 9 and 10, when the yoke is in operative position, with the cage C. The yoke has a pair of arms 35 which, when the yoke is in operative engagement with the cage, may be disposed in parallel relation to the shaft and extend in a direction away from the cage and have their opposite ends pivoted to an operating member 37 by suitable pivots 36, as best illustrated in Figures 3 and 4. The operating member 37, which may be substantially semi-circular in configuration, as shown in Figures 2 and 8, is shown having the lower terminals of its spaced legs pivotally mounted on pivot pins 38 secured in a fixed portion 39 of the bearing structure of the shaft.

A toggle mechanism, generally designated by the numeral 40, is composed of a pair of links 41 which are pivoted to the bearing structure by a pivot pin 42. A lever 43 is pivoted to the other ends of the links 41 by a pivot pin 44. The forward end of the lever 43 preferably has a stud 45 adjustably mounted therein by suitable screw threads 46, and a lock nut 47 is received in threaded engagement with the stud for securing it in adjusted position. The head of the stud 45 is preferably shaped as shown, and is adapted to be received in a depression 48 provided in the operating member 37, as best illustrated in Figures 1 and 10. The portion 49 of the bearing structure of the shaft terminates in a rotary seal which may serve as a means of introducing the heat exchange medium into the shaft, as will be understood by reference to Figure 1.

As hereinbefore stated, the terminals of the split packing element 20 are notched or stepped, as best illustrated in Figure 5, whereby the terminals of the packing element are disposed in overlapped relation when the packing element is confined within the cage C, as illustrated in Figure 6. It will be noted that when the packing element is thus confined within the cage C, a portion of the joint between the overlapped ends of the packing element is disposed on the periphery of the exposed portion of the packing element.

To prevent any possible danger of leakage through the joint at this point, a flexible sealing strip 50, preferably of rubber, is seated in a recess 51 provided in the side wall or flange 24' of the cage member 23', as shown in Figures 11 and 12. The flexible sealing strip 50 is so positioned in the recess 51 that its inner face is substantially coincident with the inner face of the flange 24', whereby the packing element may readily be fitted into the cage and removed therefrom without interference from the sealing strip 50. The sealing strip projects beyond the edge of the flange 24' a distance substantially equal to the projection of the packing element 20, when seated therein. The sealing strip is so located in the cage member 23' that it will overlie the joint between the ends of the packing element 20 when in operative position in the cage C.

The operation of the apparatus will be readily apparent by reference to Figures 3 and 4. When the packing device, including the cage C and packing element 20 is to be applied to the shaft 31 to seal the joint between the shaft and the wall of the opening in the end wall 30 of the pasteurizer, the attendant or operator, after having inserted the packing element 20 into the cage C, grasps the handles 25 of the sealing device and opens the cage members 23 and 23', as shown in Figure 7, whereby the ends of the sealing element and said members 23 and 23' may be passed over the shaft 31 and closely fitted thereto by spreading apart the handles 25, as shown in Figure 6. While the handles are so held, the cage locking yoke 34 may be lowered from its inoperative position, shown in Figure 3, to its operative position, shown in Figures 4 and 10, into engagement with the closed cage C, whereby the cage will be received in the recess provided in the end of the yoke, as shown in Figures 1, 4 and 10, after which the operator may release his grasp on the handles 25.

The semi-circular operating member 37 is next thrust forwardly towards the end wall 30, whereby the packing element 20 is pressed into sealing engagement with the backing plate 33, as a result of the yoke 34 being pivoted to the operating member by the pivots 36.

The head of the stud 45 is next inserted into the recess 48 in the member 37 and the operating lever 43 of the toggle mechanism 40 moved into the locking position shown in Figure 1, whereby the pivot 44 passes over a center line drawn between the pivot 42 and the terminal of the stud 45 to thereby securely lock the apparatus in operative position.

When the toggle mechanism is so locked, the packing element 20 is firmly compressed against the backing plate 33, and because of the packing 20 being substantially confined within its supporting cage C, it is compressed against the periphery of the shaft as well as against the backing plate, whereby access of foreign material into the pasteurizer around the shaft at this point is positively eliminated.

At the end of a day's run, or whenever necessary, the packing element 20 may be quickly removed for cleaning and sterilization by simply releasing the toggle mechanism, and then throwing back the yoke 34 to the position shown in Figure 3, whereby the pressure against the packing cage C is released and the cage may be then opened by manipulation of its handles 25 to permit its removal from the shaft. After having thus been removed from the shaft, the packing element may readily be slipped out of its supporting cage C, as shown in Figure 6 and thoroughly cleaned and sterilized, or, if necessary, a new one substituted therefor.

From the foregoing, it will thus be seen that the entire operation of removing and replacing the packing element 20 may be accomplished in a matter of a very few minutes thereby making it a simple task to clean and sterilize the packing element 20 at the close of each day's run, whereby all danger of contamination of the contents of the pasteurizer, as a result of foreign matter and bacteria finding access therethrough around the shaft 31 is substantially eliminated.

In Figure 10 there is shown a structure of slightly different construction wherein the toggle mechanism comprises spaced links 52 corresponding to the link 41 of the structure shown in the previous figures. In Figure 10, the upper ends of the links 52 are pivoted to a bracket 53 which is suitably secured to the bearing structure 54 by such means as bolts 55. The toggle lever 56 shown in Figure 10 is also slightly differently shaped from the one shown in Figure 1. The operation of the toggle mechanism illustrated in Figure 10, however, is identically the same as the operation of the toggle mechanism shown in Figure 1.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A readily detachable sealing device of the class described, comprising a cage having complemental semi-circular members pivotally connected together whereby they may be opened up and fitted around a shaft, said members, when in closed position, providing an annular seat, a split compressible packing element supported in said seat, the depth of said seat being relatively less than the axial length of the packing element, thereby to cause one end of said packing to project slightly beyond the adjacent face of the cage, a pair of handles secured to the cage members whereby the cage may be opened to facilitate applying the cage and packing to the shaft or removing it therefrom, and a pin secured in the swingable end of each cage member receivable in sockets provided in the packing element for securing the packing ends to the ends of the cage members and whereby the packing element may be drawn into close contact with the periphery of the shaft around its entire circumference.

2. A readily detachable sealing device of the class described, a cage comprising complemental semi-circular members pivotally connected together whereby they may be opened up and fitted around a shaft, said members, when in closed position, providing an annular seat, a split compressible packing element supported in said seat, the depth of said seat being relatively less than the axial length of the packing element to cause one end of said packing to project slightly beyond the adjacent face of the cage, a pair of handles secured to the cage members whereby the cage may be opened to facilitate applying the cage and packing to the shaft or removing it therefrom, and pins fixed in the cage members for immovably securing the ends of the packing element to the ends of the cage members and whereby the split ends of the packing may be drawn tightly around the shaft, the ends of said packing element being stepped whereby said ends may overlap each other at the joint thereof, and a sealing element overlying the joint between the overlapped ends of said packing at the periphery of the packing, when the packing is operatively applied to the shaft.

3. In a sealing device of the class described, a split cage comprising complemental semi-circular members cooperating, when closed, to provide an annular seat of substantial depth adapted to receive a split compressible packing, means whereby the cage members may readily be opened up to facilitate applying them to a shaft or removing them therefrom, and a rubber-like element secured to the end of one of said cage members adapted to overlie the joint between the ends of the compressible packing, when the latter is fitted about a shaft and is operatively engaged therewith, thereby to prevent leakage through the packing joint.

4. In a sealing device of the class described, a split cage comprising complemental semi-circular members pivotally connected together, whereby they may be opened to facilitate applying them around a shaft, a split compressible packing element supported in said cage and encircling the shaft, a yoke fitted over the shaft and having a recess in the face thereof for receiving the packing cage when the latter is in closed operative engagement with the shaft, thereby to secure the split members of the cage against opening, and the toggle mechanism for longitudinally translating the yoke on the shaft to thereby compress the packing against a suitable packing plate.

5. In combination with a container wall having an opening therein and a shaft passing through said opening, a backing plate secured to said wall and having an opening therein for receiving the shaft, a sealing device comprising a split cage composed of semi-circular members pivoted together and when in closed position providing an annular seat, a split compressible packing element received in said seat, means engageable with the complemental members of said device for securing said members in closed position around the shaft, and means for longitudinally translating said securing means and packing cage on the shaft to firmly compress the packing against the backing plate, thereby to positively prevent access of lubricants and foreign matter into the container, or leakage of the contents of the container through said wall around the shaft.

6. In combination with a container wall having an opening therein and a shaft passing through said opening, a backing plate secured to said wall and having an opening therein aligned with the opening in the wall, a sealing device comprising a split cage composed of semi-circular members pivoted together and when in closed position providing an annular seat of substantial depth, a split compressible packing element secured in said seat and completely encircling the shaft, means for securing the complemental members of the sealing device in closed position around the shaft, whereby the packing element is firmly compressed against the periphery of the shaft, and means for longitudinally translating the sealing device on the shaft to move the packing against the backing plate, and compress it thereagainst, thereby to positively prevent leakage between the periphery of the shaft and the wall of the opening through which it passes.

7. In combination with a container wall having an opening therein and a shaft passing through said opening, means for preventing leakage through said wall around said shaft, including a split cage, a split compressible packing element in said cage completely encircling the shaft, and axially projecting from one end of the cage, a backing plate secured to the wall of the container against which said packing is seated, a yoke having a recess in its outer face adapted to receive the packing when the latter is in closed operative position around the shaft, and thereby to retain the sealing device in such a position, a toggle mechanism operatively connected to said yoke, whereby the yoke may be axially translated on the shaft to force the packing into sealing engagement with the backing plate, and the periphery of the shaft, and means embodied in the toggle mechanism for taking up play in the parts, whereby the packing may be retained in leaktight engagement with the shaft and backing plate.

8. In combination with a container wall having an opening therein and a shaft extending through said opening, means for preventing leakage around said shaft where it passes through said opening, comprising a cage composed of complemental semi-circular members pivoted together and cooperating to provide an annular seat, when the members are in closed position, a split compressible packing supported in said cage and encircling the shaft, said packing projecting from one end of the cage, angularly disposed handles secured to said cage members, whereby they may be applied to or removed from the shaft, a backing plate secured to said wall against which said packing is seated, a yoke having a recess in its outer face adapted to receive a sealing device when the latter is in closed operative position on the shaft, thereby to retain the sealing device in such position, a toggle mechanism operatively connected to said yoke for axially translating said yoke on the shaft to force the packing into sealtight engagement with the backing plate and the periphery of the shaft, and means embodied in the toggle mechanism for taking up play in the parts, whereby the yoke may always be firmly engaged with the packing cage to positively hold the packing in leaktight engagement with the shaft and backing plate, and also whereby the split cage is locked against accidental opening.

9. In a sealing device of the class described, a split cage comprising complemental semi-circular members cooperating when closed to provide an annular seat of substantial depth, a split compressible packing received in the annular seat provided by said cage members and having one side face thereof projecting beyond the cylindrical wall of the cage, means whereby the cage members may readily be opened to facilitate applying the sealing device to a shaft or removing it therefrom, a sealing element secured to the end of one of said cage members adapted to overlie the joint between the ends of the compressible packing when the latter is fitted about a shaft and is operatively engaged therewith, thereby to prevent leakage through the packing joint.

HAROLD L. SOLIE.

REFERENCES CITED

The following references are of record in the file of this patent:

UNITED STATES PATENTS

| Number | Name | Date |
| --- | --- | --- |
| 563,577 | Drum | July 7, 1896 |
| 1,178,629 | Corns | Apr. 11, 1916 |
| 1,701,777 | Jensen | Feb. 12, 1929 |